(No Model.)
J. W. LOOMIS.
EVAPORATOR.
No. 553,532. Patented Jan. 28, 1896.
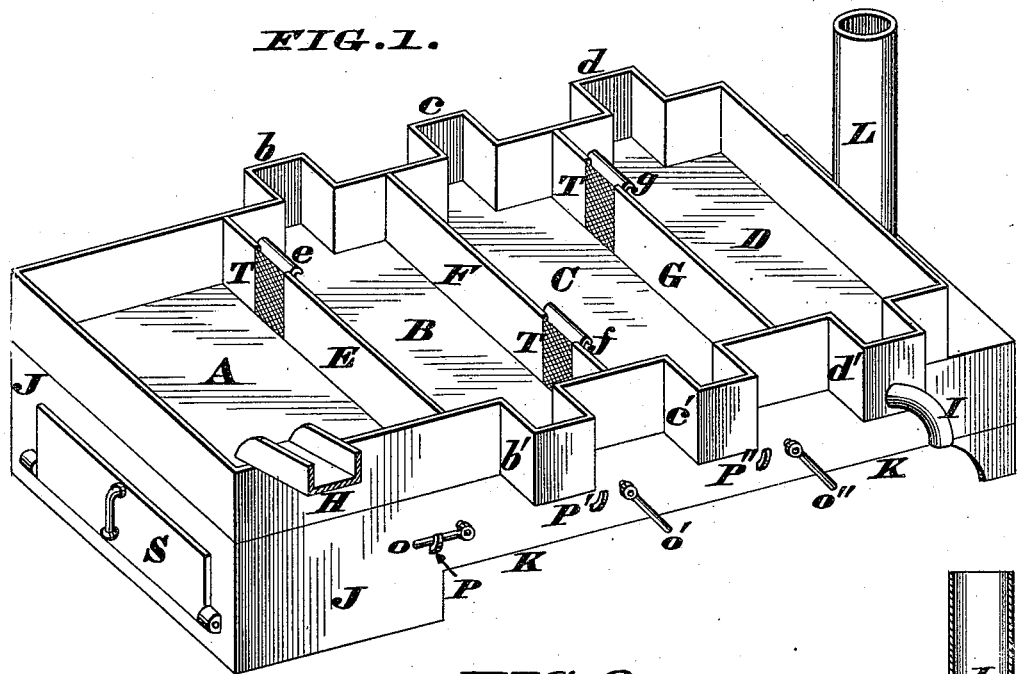
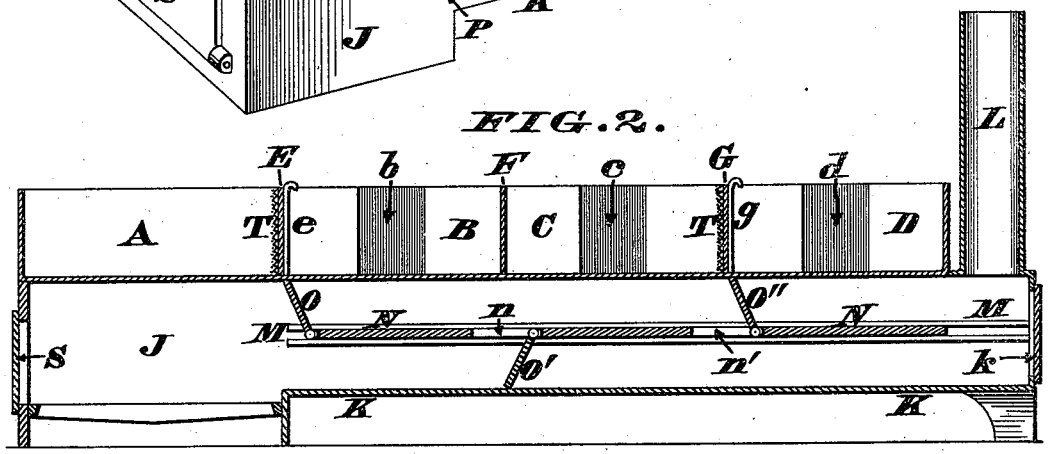
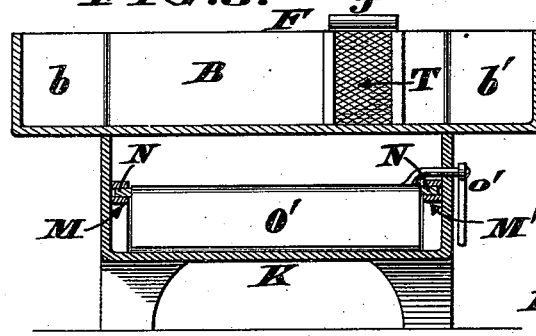
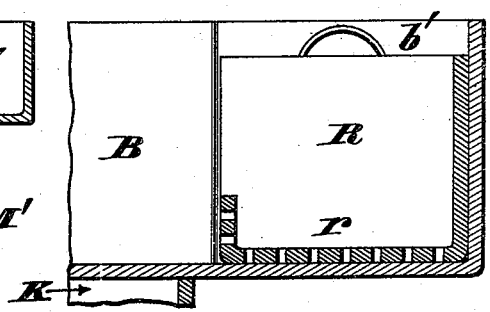
Attest.
Ida Heitz
Samuel M. Queen
Inventor.
John W. Loomis.
by James H. Layman.
Atty

UNITED STATES PATENT OFFICE.

JOHN W. LOOMIS, OF DOUDTON, KENTUCKY.

EVAPORATOR.

SPECIFICATION forming part of Letters Patent No. 553,532, dated January 28, 1896.

Application filed June 8, 1895. Serial No. 552,095. (No model.)

*To all whom it may concern:*

Be it known that I, JOHN W. LOOMIS, a citizen of the United States, residing at Doudton, in the county of Pendleton and State of Kentucky, have invented certain new and useful Improvements in Evaporators; and I do hereby declare the following to be a full, clear, and exact description of the invention, reference being had to the annexed drawings, which form a part of this specification.

This invention relates to those evaporators which include a furnace, a horizontal pan, divided into a number of compartments by cross-partitions, and slides or gates so arranged as to cause sorghum or other vegetable juices to describe a very sinuous path as it travels from the hottest to the coolest part of the apparatus; and the first part of my improvements consists in providing a suitable number of these compartments with skimming-pockets, the special location and arrangements of said pockets being hereinafter more fully described, and then defined in the claims.

The second part of my improvements consists in fitting a bodily-removable strainer within each pocket, which strainer can be readily lifted out of the pan whenever occasion requires, as hereinafter more fully described.

The third part of my improvements consists in fitting a single horizontal flue-plate within a smoke passage or conduit under the pan, which plate has a number of openings provided with flaps or dampers capable of being so set as to throw the heat toward or away from either compartment of said pan, as hereinafter more fully described.

The fourth part of my improvements consists in fitting said plate within guides secured to the inner sides of the flue or passage, in order that said plate, together with its flaps or dampers, may be readily removed when occasion requires, as hereinafter more fully described.

In the annexed drawings, Figure 1 is a perspective view of an evaporator embodying my improvements. Fig. 2 is a longitudinal section of the apparatus, taken in the plane of the smoke-pipe, the flue-dampers being so set as to throw the heat against the central one of three compartments. Fig. 3 is an enlarged transverse section of one of said compartments, the section being taken through a pair of the skimming-pockets. Fig. 4 is a still greater enlarged section showing a strainer fitted within one of said pockets.

Referring to Fig. 1, it will be noticed that the pan of my evaporator is composed of four separate and distinct compartments A B C D, having vertical partitions E F G between them, said partitions being provided with slides or gates $e f g$, so arranged as to cause the sirup to describe a very sinuous path from the inlet H to the outlet I, the inlet being in communication with a tank or barrel or other source of supply. These compartments A B C D are not arranged at different levels, but are all in the same horizontal plane, and three of them, B C D, are provided with skimming-pockets $b\ b'\ c\ c'\ d\ d'$ of any suitable capacity.

A pair of pockets is provided for every compartment, one at each end of the latter, and said pockets are of the same height as the sides of the pan, are entirely open at top, but closed on three sides and at bottom, and project some distance beyond the sides of the furnace. Furthermore, they have no connection to, or means of communicating with, any of the neighboring compartments, but are to be used solely with the special division of the pan to which they are applied.

Located under the first compartment A is the furnace or fire-box J, from which proceeds rearwardly a flue or conduit K having at its end a door $k$ and provided with a smoke-pipe L. Secured to the inner sides of this flue, as more clearly seen in Fig. 3, are guides M M' for a longitudinal division-plate N, having a pair of transverse passages $n\ n'$ and three hinged flaps or dampers O O' O'', the latter being operated by external handles $o\ o'\ o''$, as represented in Fig. 1.

P P' P'' are stops over which said handles can be sprung for the purpose of retaining the dampers in their elevated positions.

R, in Fig. 4, represents a strainer capable of fitting quite snugly, but not tightly, within a pocket and having its bottom and one side perforated at $r$.

S is the furnace-door.

T are wire-gauze or perforated-metal screens so applied to the evaporator as to prevent sediment or scum passing from one compartment to another.

The operation of my evaporator is as follows: The sirup first flows into the pan at the spout H, and then, by properly adjusting the gates $e\ f\ g$, the flow of the current through the various compartments of the pan can be regulated with the utmost nicety until the outlet I is reached. During this meandering flow of the sirup the scum and other impurities naturally collect within the various pockets, because they are the coolest parts of the pan, and as said pockets are completely open at top these gross matters can be readily removed with a proper implement. Furthermore, as these pockets open directly into the pan without any intervening screen or other barrier, the skimmer can be operated so as to assist the flow of the impurities from the center of the respective compartment into said cooler-receptacles $b\ b'\ c\ c'\ d\ d'$. Again, all sediment that may be deposited by these impurities will collect within the strainers R, and by simply lifting the latter bodily out of the pockets the scum and sediment will be carried off, the pure sirup, if any, being free to drain out through the perforations $r$.

It is evident that by properly setting the flaps or dampers the heat can be concentrated under any special pan or pans, one change of said dampers being seen in Fig. 2, where the flaps $O\ O''$ are closed and the other damper, $O'$, opened, the result being to cause a very rapid boiling of the sirup within the compartment C, while the two other compartments, B D, are relatively cooler; but if it should be desired to dispense with these dampers, their handles are first detached, the rear door $k$ opened, and then the plate N together with said dampers are drawn bodily out of the flue or conduit K. This bodily withdrawal of said plate can be done when the flue is to be cleaned, or when the dampers burn out and new ones have to be inserted in their place.

I claim as my invention—

1. The combination, in an evaporator, of a furnace, and a set of communicating pans mounted thereon, and having their ends flush with the sides of said furnace, each end of the pans being provided with an independent skimming-pocket of less width than the pan, and projecting beyond the sides of said furnace, all as herein described.

2. The combination, in an evaporator, of a furnace, a pan mounted thereon, and having its ends flush with the sides of said furnace, a skimming-pocket at the end of said pan, of less width than the latter, and projecting beyond said furnace sides, and an independent bodily-removable strainer R$r$, fitted within said pocket, all as herein described.

3. The combination, in an evaporator, of a furnace, a series of communicating pans, all arranged on the same level and situated one behind another, a smoke conduit proceeding from said furnace, and a flue-plate fitted within said conduit, so as to divide it into an upper and lower channel, said plate being provided with a separate opening and damper for each pan situated above said conduit, all as herein described, and for the purpose stated.

4. The combination, in an evaporator, of a furnace, a series of communicating pans, all arranged on the same level and situated one behind another, a smoke conduit proceeding from said furnace, and a bodily-removable flue-plate fitted within said conduit and dividing it throughout its entire length into an upper and lower channel, said plate being provided with a separate opening and damper for each pan situated above said conduit, all as herein described.

In testimony whereof I affix my signature in presence of two witnesses.

JOHN W. LOOMIS.

Witnesses:
S. M. LOOMIS,
C. C. JUSTICE.